(12) United States Patent
Swanson

(10) Patent No.: US 7,566,162 B1
(45) Date of Patent: Jul. 28, 2009

(54) APPARATUS AND METHOD FOR A HOT MIX ASPHALT PLANT USING A HIGH PERCENTAGE OF RECYCLED ASPHALT PRODUCTS

(75) Inventor: Malcolm Swanson, Chickamauga, GA (US)

(73) Assignee: Astec, Inc., Chattanooga, TN (US)

(*) Notice: Subject to any disclaimer, the term of this patent is extended or adjusted under 35 U.S.C. 154(b) by 478 days.

(21) Appl. No.: 11/369,271

(22) Filed: Mar. 7, 2006

(51) Int. Cl.
  *B28C 5/20* (2006.01)
(52) U.S. Cl. .............................. 366/7; 366/15; 366/23; 366/25
(58) Field of Classification Search .............. 366/7, 366/15, 22–25; 404/80, 92
  See application file for complete search history.

(56) References Cited

U.S. PATENT DOCUMENTS

| | | | | |
|---|---|---|---|---|
| 2,487,887 | A * | 11/1949 | McEachran | 366/15 |
| 3,975,002 | A * | 8/1976 | Mendenhall | 366/7 |
| 3,999,743 | A * | 12/1976 | Mendenhall | 366/4 |
| 4,096,588 | A * | 6/1978 | Mendenhall | 366/7 |
| 4,165,184 | A * | 8/1979 | Schlarmann | 366/12 |
| 4,189,238 | A * | 2/1980 | Mendenhall | 366/7 |
| 4,215,941 | A * | 8/1980 | Mendenhall | 366/25 |
| 4,318,619 | A * | 3/1982 | Schlarmann | 366/4 |
| 4,387,996 | A * | 6/1983 | Mendenhall | 366/4 |
| 4,395,129 | A * | 7/1983 | Musil | 366/25 |
| 4,481,039 | A * | 11/1984 | Mendenhall | 106/281.1 |
| 4,619,550 | A * | 10/1986 | Jeppson | 404/80 |
| 4,705,404 | A * | 11/1987 | Bruggemann | 366/7 |
| 4,856,202 | A * | 8/1989 | Radomsky | 34/371 |
| 4,867,572 | A * | 9/1989 | Brock et al. | 366/25 |
| 4,868,999 | A * | 9/1989 | Radomsky | 34/127 |
| 4,913,552 | A * | 4/1990 | Bracegirdle | 366/4 |
| 4,946,283 | A * | 8/1990 | Musil | 366/15 |
| 4,954,995 | A * | 9/1990 | Marconnet | 366/7 |

(Continued)

FOREIGN PATENT DOCUMENTS

WO  WO-2007/103345 A2 *  9/2007

*Primary Examiner*—David L Sorkin
*Assistant Examiner*—Andrew Janca
(74) *Attorney, Agent, or Firm*—Chambliss, Bahner & Stophel, P.C.

(57) ABSTRACT

A hot mix asphalt plant for producing hot mix asphalt using a high percentage of RAP comprising a first dryer adapted to receive and mix virgin aggregates and RAP fines and a first burner assembly adapted to produce a burner flame and heat and dry the virgin aggregates in the first dryer. The plant also includes a second dryer adapted to receive coarse RAP and a second burner assembly adapted to produce a burner flame and heat and dry the coarse RAP in the second dryer. The plant further comprises a pugmill adapted to receive the virgin aggregates and the RAP fines from the first dryer and the coarse RAP from the second dryer and mix the virgin aggregates, the RAP fines and the coarse RAP to produce hot mix asphalt. The method of the invention includes the steps of providing first dryer, a first burner, a second dryer, and a second burner, conveying the virgin aggregates to the first dryer, heating and drying the virgin aggregates in the first dryer, conveying the RAP fines to the first dryer, mixing the virgin aggregates and the RAP fines in the first dryer, conveying the coarse RAP to the second dryer, heating and drying the coarse RAP in the second dryer, and mixing the coarse RAP, the RAP fines and the virgin aggregates to produce hot mix asphalt.

8 Claims, 6 Drawing Sheets

U.S. PATENT DOCUMENTS

| | | | | |
|---|---|---|---|---|
| 4,957,434 | A * | 9/1990 | Radomsky | 432/103 |
| 5,054,931 | A * | 10/1991 | Farnham et al. | 366/25 |
| 5,090,813 | A | 2/1992 | McFarland et al. | |
| 5,174,650 | A | 12/1992 | McFarland et al. | |
| 5,178,456 | A * | 1/1993 | Marconnet | 366/25 |
| 5,201,839 | A * | 4/1993 | Swisher, Jr. | 366/4 |
| 5,209,563 | A * | 5/1993 | Swisher et al. | 366/22 |
| 5,303,999 | A * | 4/1994 | Nath et al. | 366/25 |
| 5,305,533 | A * | 4/1994 | Alexander et al. | 34/549 |
| 5,322,367 | A * | 6/1994 | Nath et al. | 366/7 |
| 5,352,275 | A * | 10/1994 | Nath et al. | 95/117 |
| 5,397,177 | A * | 3/1995 | Swisher, Jr. | 366/25 |
| 5,478,530 | A * | 12/1995 | Swanson | 422/170 |
| 5,522,158 | A | 6/1996 | Swanson | |
| 5,538,340 | A * | 7/1996 | Brashears | 366/25 |
| 5,551,166 | A | 9/1996 | Milstead | |
| 5,573,396 | A | 11/1996 | Swanson | |
| 5,596,935 | A * | 1/1997 | Swanson | 110/235 |
| 5,772,317 | A * | 6/1998 | Butler | 366/7 |
| 7,357,562 | B2 * | 4/2008 | Hawkins | 366/23 |
| 7,384,181 | B1 * | 6/2008 | Collette | 366/7 |

* cited by examiner

APPARATUS AND METHOD FOR A HOT MIX ASPHALT PLANT USING A HIGH PERCENTAGE OF RECYCLED ASPHALT PRODUCTS

FIELD OF THE INVENTION

The present invention relates generally to hot mix asphalt plants adapted to produce hot mix asphalt, and particularly to hot mix asphalt plants using a high percentage of recycled asphalt products to produce hot mix asphalt.

BACKGROUND AND DESCRIPTION OF THE PRIOR ART

It is known to mix recycled asphalt products ("RAP") with virgin aggregate to produce hot mix asphalt ("HMA"). The virgin aggregate is typically first heated and dried in a rotary drum of a counterflow dryer and then mixed with RAP and liquid asphalt in a separate mixing chamber of the counterflow dryer to form a hot asphalt mix suitable for paving. One such counterflow dryer, manufactured by Astec Industries, Inc. and commonly known as a "double barrel dryer", is schematically illustrated in FIG. 1. The counterflow dryer 10 illustrated in FIG. 1 comprises an inner drum 12 and a fixed outer sleeve 24 mounted on a common frame 16 in an inclined manner. The inner drum 12 is rotatably mounted on the frame 16 by a plurality of bearings 18 and is driven to rotate by a suitable motor 20. A burner 22 directs a flame 24 generally axially into the interior of inner drum 12.

Inner drum 12 has at its first (upper) end 26 a virgin aggregate inlet 28 and a combustion products outlet 30 and has at its second (lower) end 32 a plurality of openings 34 forming heated and dried virgin aggregate outlets. Inner drum 12 also supports a plurality of paddles 36 extending into a mixing chamber 38 formed between the inner drum 12 and the outer sleeve 14. The interior of the inner drum 12 is functionally separated into a combustion zone located in the vicinity of the burner flame 24 and a drying zone located between the combustion zone and the first end 26 of the drum 12.

Outer sleeve 14 is separated from the inner drum 12 by a sufficient distance to form a mixing chamber 38 which is sufficiently wide to provide clearance for the paddles 36. Outer sleeve 14 has an upper RAP inlet 40, a virgin aggregate inlet 42 cooperating with the openings 34 of the inner drum 12, and an asphalt mix outlet 44. Outer sleeve 14 also receives suitable equipment (not shown) for injecting liquid asphalt into the mixing chamber 38.

In use, virgin aggregate is fed into the virgin aggregate inlet 28 of the inner drum 12 via a suitable conveyor 46 and is heated and dried as it travels downwardly through the inclined drum 12 counter to the direction of the flame 24 from the burner 22. Heated and dried aggregate in the second end 32 of the drum 12 falls through openings 34 in the drum 12, through the inlet 42 in the sleeve 14, and into the mixing chamber 38. RAP is simultaneously fed into mixing chamber 38 from the sleeve inlet 40 by a suitable conveyor 48 and is mixed by the paddles 36 with the heated and dried virgin aggregate. Liquid asphalt is also normally injected at this time, thereby forming an asphalt paving mix. In addition to mixing the virgin aggregate, RAP, and liquid asphalt, the paddles 36 also convey the resulting mix to the mixing chamber outlet 44, where the mix is discharged from counterflow dryer 10. Combustion products formed during operation of counterflow dryer 10 rise out of the inner drum 12 through outlet 30 and are conveyed to a downstream device such as a baghouse.

It is also know to use a counterflow dryer in combination with a parallel flow dryer to produce HMA. Conventional HMA plants employing a counterflow and a parallel flow dryer use the parallel flow dryer to heat and dry the RAP, and the counterflow dryer to heat and dry the virgin aggregate and to mix the virgin aggregate with liquid asphalt cement.

However, conventional hot mix asphalt plants utilizing counterflow dryers and/or parallel flow dryers to produce HMA suffer from several disadvantages. For example, conventional plants are limited in the percentage of RAP that may be used to produce HMA. Conventional plants also generate and emit smoke and other harmful emissions produced by RAP. Conventional plants are expensive to operate and produce HMA having inferior quality. Further, conventional plants require significant heating and drying loads to be placed on the parallel flow dryer. Still further, conventional plants do not recycle a large proportion of the gases produced by the parallel flow dryer. In addition, conventional plants do not separate RAP according to gradation. Conventional plants also do not control the characteristics of the HMA produced by the plant by controlling the gradation of RAP used. Further, conventional plants do not introduce RAP into different dryers depending upon the gradation of the RAP. Still further, conventional plants do not sufficiently reduce airborne RAP particles or sticking between RAP particles and the equipment of the plant.

It would be desirable, therefore, if an apparatus and method for a hot mix asphalt plant could be provided that would use a high percentage of RAP. It would also be desirable if such a plant could be provided that would reduce smoke and other harmful emissions produced by RAP. It would be further desirable if such a plant could be provided that would produce high quality, cost-effective hot mix asphalt. It would be still further desirable if such a plant could be provided that would reduce the heating and drying loads placed on the parallel flow dryer. In addition, it would be desirable if such a plant could be provided that would recycle a large proportion of the gases produced by the parallel flow dryer. It would be also be desirable if such a plant could be provided that would separate RAP according to gradation. It would be further desirable if such a plant could be provided that would control the characteristics of the HMA produced by the plant by controlling the gradation of RAP used. It would be still further desirable if such a plant could be provided that would introduce RAP into different dryers depending upon the gradation of the RAP. Additionally, it would be desirable if such a plant could be provided that would reduce airborne RAP particles. It would also be desirable if such a plant could be provided that would reduce sticking between RAP particles and the equipment of the plant.

ADVANTAGES OF THE PREFERRED EMBODIMENTS OF THE INVENTION

Accordingly, it is an advantage of the preferred embodiments of the invention described herein to provide an apparatus and method for a hot mix asphalt plant using a high percentage of RAP. It is also an advantage of the preferred embodiments of the invention to reduce smoke and other harmful emissions produced by RAP. It is another advantage of the preferred embodiments of the invention to produce high quality, cost-effective hot mix asphalt. It is a further advantage of the preferred embodiments of the invention to reduce the heating and drying loads placed on the parallel flow dryer. It is a still further advantage of the preferred embodiments of the invention to recycle a large proportion of the gases produced by the parallel flow dryer. In addition, it is an advantage of the preferred embodiments of the invention to separate RAP according to gradation. It is also an advantage of the preferred embodiments of the invention to control the characteristics of hot mix asphalt produced by the plant by controlling the gradation of RAP used. It is another advantage of the preferred embodiments of the invention to introduce RAP into different dryers depending upon the gradation of the RAP. It is a further advantage of the preferred embodiments of the invention to reduce airborne RAP particles. It is a still further advantage of the preferred embodiments of the invention to reduce sticking between RAP particles and the equipment of the plant.

Additional advantages of the invention will become apparent from an examination of the drawings and the ensuing description.

Explanation of Technical Terms

As used herein, the term "airheater" refers to any structure that is adapted to receive recirculated gases and/or air and into which a burner assembly may be fired.

As used herein, the term "baghouse" refers to any structure adapted to trap solids that have temporarily combined with gases.

As used herein, the terms "burner" and "burner assembly" refer to any device adapted to produce a burner flame which may be used to heat and dry virgin aggregates, cold feed, RAP and the like in connection with the production of hot mix asphalt.

As used herein, the term "cyclone" refers to any device that is adapted to separate dust and/or coated RAP particles from a gas stream.

As used herein, the term "coarse RAP" refers to recycled asphalt products that have a size of greater than approximately 3/16"

As used herein, the term "Double RAP" refers to any counterflow dryer adapted to be used in the process of heating and drying virgin aggregate materials, cold feed and/or RAP.

As used herein, the term "drag conveyor" refers to any device adapted to convey HMA.

As used herein, the term "dust silo" refers to any structure adapted to receive and store dust produced by or for the production of hot mix asphalt.

As used herein, the term "gas recirculation fan" refers to any device adapted to produce a gas flow from one location toward another location.

As used herein, the term "HMA silo" refers to any structure adapted to receive and store hot mix asphalt.

As used herein, the terms "liquid asphalt cement" and "liquid AC" and "AC" refer to a substance or material used in combination with virgin aggregates, cold feed, RAP and the like in connection with the production of hot mix asphalt. The terms "liquid asphalt cement" and "liquid AC" and "AC" more particularly refer to any substance or material that has the characteristic of forming a cohesive relationship between virgin aggregates, cold feed, RAP and the like for the purpose of producing hot mix asphalt.

As used herein, the term "preseparator" refers to any device that is adapted to separate dust and coated RAP particles from a gas stream.

As used herein, the term "pugmill" refers to any device adapted to mix materials such as virgin aggregates, cold feed, RAP, liquid asphalt cement and the like to produce HMA.

As used herein, the terms "RAP" and "recycled asphalt products" refer to materials that have been previously used to produce hot mix asphalt.

As used herein, the terms "RAP Dryer" and "coarse RAP Dryer" refer to any dryer adapted to be used in the process of heating and drying virgin aggregate materials, cold feed and/or RAP.

As used herein, the term "RAP fines" refers to recycled asphalt products that have a size of approximately 3/16" or smaller.

As used herein, the term "scalping screen" refers to any device adapted to remove oversized materials such as trash, debris and the like from virgin aggregates, cold feed and the like.

As used herein, the terms "virgin aggregates" and "cold feed" refer to particulate materials that are substantially free of liquid asphalt cement and RAP.

SUMMARY OF THE INVENTION

The invention described and claimed herein comprises a hot mix asphalt plant for producing hot mix asphalt using a high percentage of RAP. The hot mix asphalt plant comprises a first dryer adapted to receive and mix virgin aggregates and RAP fines and a first burner assembly adapted to produce a burner flame and heat and dry the virgin aggregates in the first dryer. The hot mix asphalt plant also includes a second dryer adapted to receive coarse RAP and a second burner assembly adapted to produce a burner flame and heat and dry the coarse RAP in the second dryer. The hot mix asphalt plant further comprises a pugmill adapted to receive the virgin aggregates and the RAP fines from the first dryer and the coarse RAP from the second dryer and mix the virgin aggregates, the RAP fines and the coarse RAP to produce hot mix asphalt.

In the preferred embodiment of the apparatus of the invention, the hot mix asphalt plant also includes a gas recirculation system adapted to recirculate a portion of the exhaust from the second dryer and produce a recirculated gas stream. The preferred gas recirculation system comprises an airheater disposed adjacent to the second burner assembly and adapted to receive the recirculated gas stream, a gas recirculation tube adapted to convey the recirculated gas stream from the second dryer to the airheater, a gas recirculation fan adapted to urge the recirculated gas stream toward the airheater, and a separator cyclone adapted to remove dust and RAP particles from the recirculated gas stream and convey the dust and RAP particles to the pugmill.

The invention described and claimed herein also comprises a method for producing hot mix asphalt using a high percentage of RAP. The method includes providing a hot mix asphalt plant adapted to produce hot mix asphalt using a high percentage of RAP. The hot mix asphalt plant comprises a first dryer adapted to receive and mix virgin aggregates and RAP fines, a first burner assembly adapted to produce a burner flame and heat and dry the virgin aggregates in the first dryer, a second dryer adapted to receive coarse RAP, and a second burner assembly adapted to produce a burner flame and heat and dry the coarse RAP in the second dryer. The method also comprises conveying the virgin aggregates to the first dryer, heating and drying the virgin aggregates in the first dryer, conveying the RAP fines to the first dryer, mixing the virgin aggregates and the RAP fines in the first dryer, conveying the coarse RAP to the second dryer, heating and drying the coarse RAP in the second dryer, and mixing the coarse RAP, the RAP fines and the virgin aggregates to produce hot mix asphalt.

In the preferred method for producing hot mix asphalt using a high percentage of RAP, the virgin aggregates are heated to a temperature higher than the temperature of the finished hot mix asphalt, and the coarse RAP is heated to a temperature lower than the temperature of the finished hot mix asphalt. Also in the preferred method for producing hot mix asphalt using a high percentage of RAP, the RAP fines and the virgin aggregates are mixed in a mixing chamber separated from the burner flame produced by the first burner assembly, and the combination of the coarse RAP and the RAP fines constitute up to approximately eighty percent (80%) of the material used to produce the hot mix asphalt.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
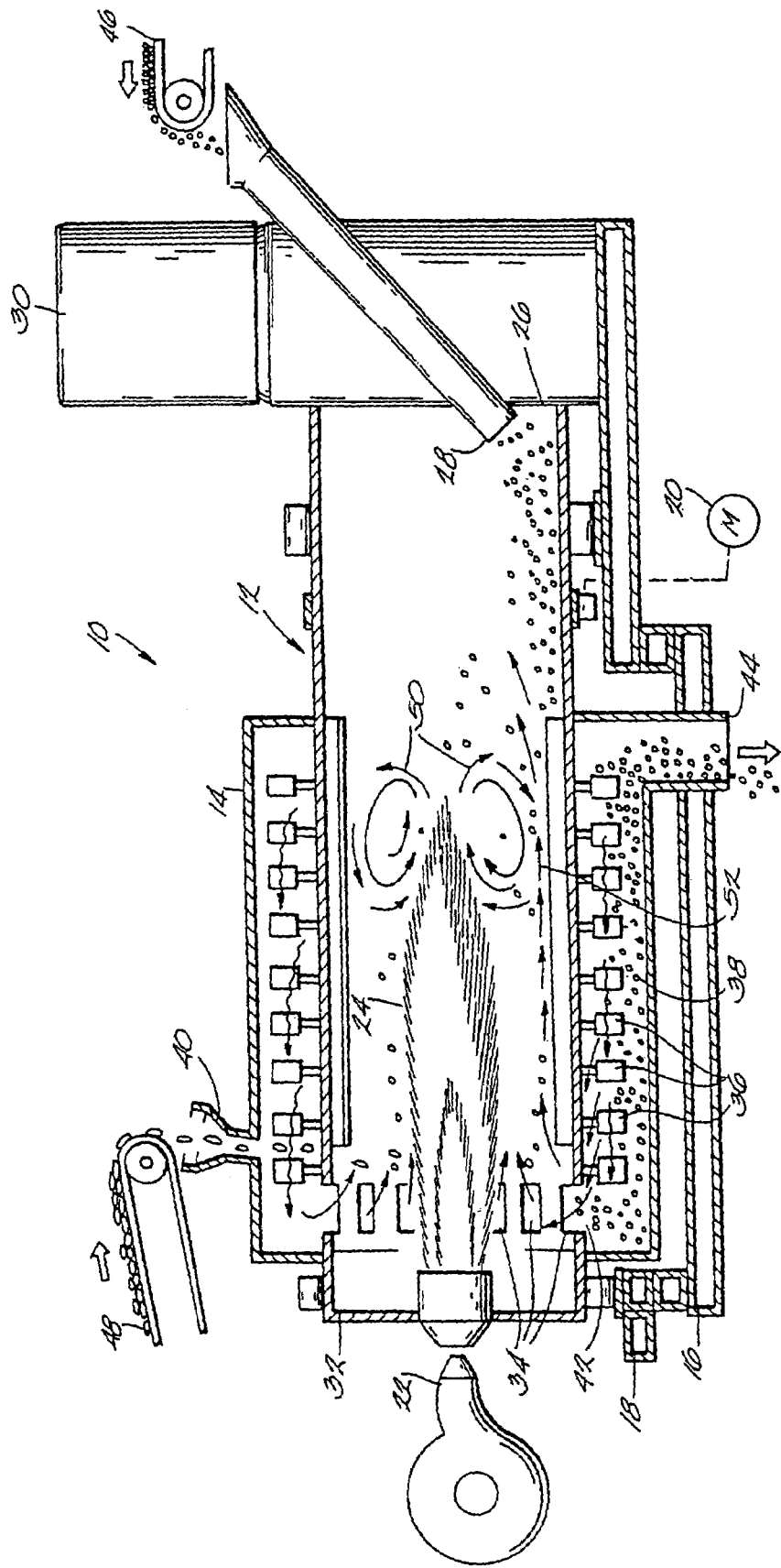
FIG. 1 is an exemplary conventional "double barrel" drum mixer adapted to heat and dry aggregate materials used in the production of hot mix asphalt.

Referring now to the drawings, the preferred embodiments of the hot mix asphalt plant using a high percentage of recycled asphalt products in accordance with the present invention are illustrated in FIGS. 2 through 6. As shown in FIGS. 2 through 6, the preferred hot mix asphalt plant is adapted to produce hot mix asphalt ("HMA") using a combination of recycled asphalt products ("RAP"), virgin aggregate or cold feed, and liquid asphalt cement ("liquid AC" or "AC"). More particularly, the preferred hot mix asphalt plant is capable of producing HMA using up to 80% RAP. The preferred hot mix asphalt plant employs a plurality of dryers into which different gradations of RAP are introduced. In the preferred embodiments of the invention, RAP is separated into different gradations by screening with a high frequency screen prior to being received in a dryer. It is contemplated within the scope of the invention, however, that the RAP may be separated into different gradations by any suitable means. While FIGS. 2 through 6 illustrate plants using two different RAP sizes, i.e. coarse and fine, more than two different RAP sizes may be used in the preferred hot mix asphalt plant of the invention. As a result, RAP sizes may be controlled to produce the desired HMA. In addition, the proportions of the different size RAP used to produce HMA may be controlled, further enabling the desired HMA.

Figure 2:
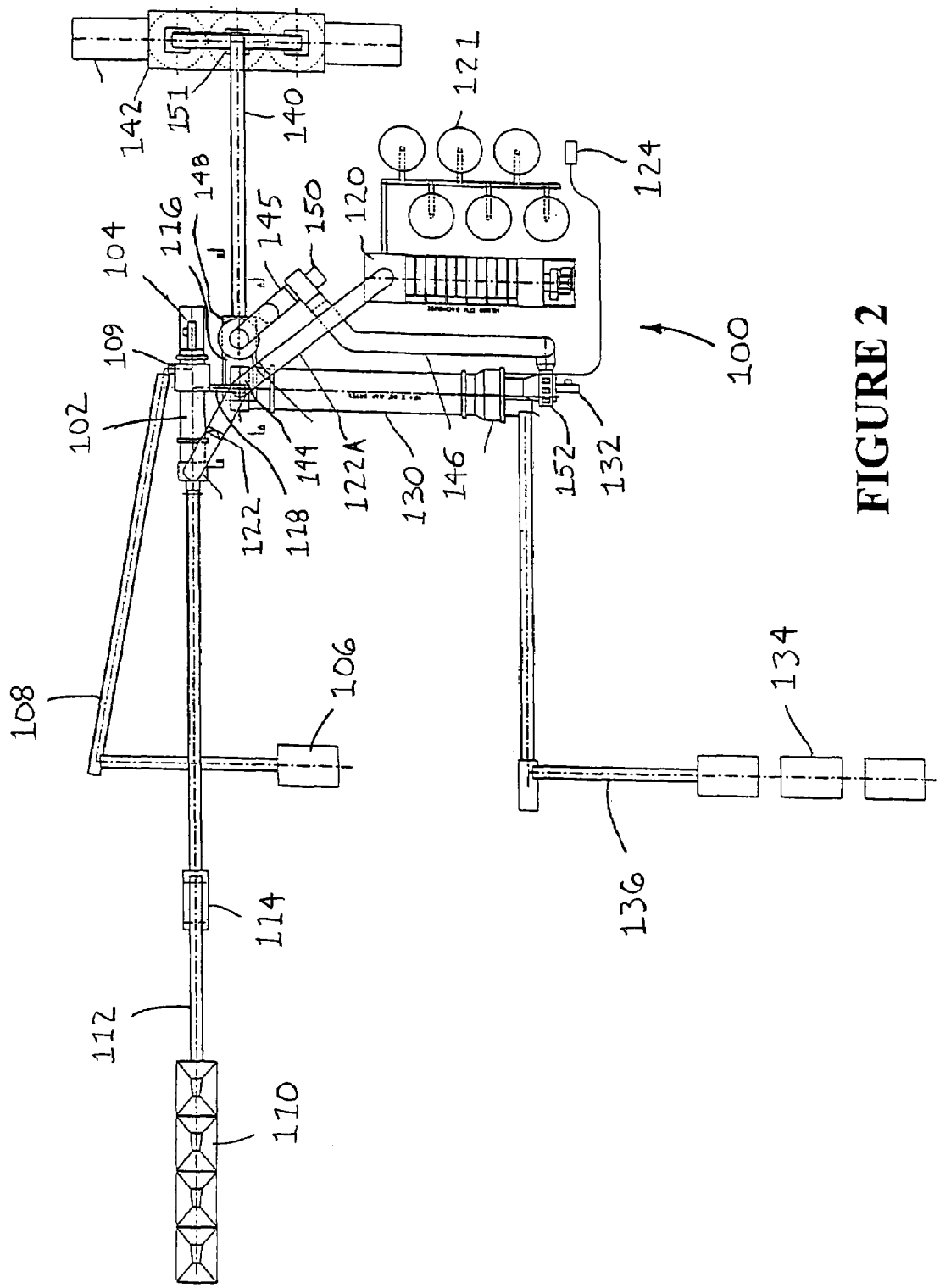
FIG. 2 is a top view of the preferred hot mix asphalt plant of the present invention.

Referring now to FIG. 2, a top view of the preferred hot mix asphalt plant of the present invention is illustrated. As shown in FIG. 2, the preferred hot mix asphalt plant 100 comprises a counterflow dryer/drum mixer such as Double RAP 102 and a first burner assembly 104 which is preferably disposed at one end of the RAP Dryer, i.e., the burner end. The preferred Double RAP 102 is a 6', rotating, counter-flow dryer in which the general direction of travel of the virgin aggregate in the dryer is opposite from the general direction of travel of the gas flow in the dryer. It is contemplated within the scope of the invention, however, that the size of the preferred Double RAP will depend upon the capacity of a particular plant. In general, the preferred Double RAP 102 is similar to a conventional double barrel dryer, however, it has a shorter mixing chamber and no liquid asphalt injection means. The preferred first burner assembly 104 is any suitable burner assembly adapted to produce a burner flame and heat and dry materials in a counterflow dryer like the preferred Double RAP 102.

The preferred Double RAP 102 is adapted to receive RAP fines and heat and dry said RAP fines. The preferred RAP fines are conveyed from RAP fines bin 106 by RAP fines conveyors 108. RAP fines are preferably defined as RAP particles having a size of approximately 3/16" or less. The preferred Double RAP 102 receives RAP fines in mixing chamber 109 of the Double RAP at the burner end of the Double RAP. By introducing the RAP fines into the mixing chamber of the Double RAP, they are not directly exposed to the hot gas stream produced by first burner assembly 104. This reduces the amount of smoke produced by the RAP fines which are the RAP particles that produce to the most smoke upon direct exposure to hot gases based upon the high proportion of surface area to volume of such material. In addition, when RAP fines are generating smoke, the liquid asphalt cement contained in the RAP fines is degraded and/or burned. Degraded and/or burned liquid AC produces harmful emissions, diminished HMA quality and less cost-effective HMA production.

RAP fines having a high proportion of surface area to volume hold a higher proportion of water than coarse RAP particles having a lower proportion of surface area to volume. For example, a ton of RAP fines holds more water than a ton of coarse RAP. By separating RAP fines to the Double RAP, less water is introduced into the RAP Dryer, thereby reducing the thermal load on the RAP Dryer.

Referring still to FIG. 2, the preferred Double RAP 102 is also adapted to receive virgin aggregate or cold feed in a wide variety of sizes and to heat and dry the virgin aggregate. The preferred Double RAP 102 receives virgin aggregate on the end of the dryer opposite from burner assembly 104. Unlike the RAP fines, the virgin aggregates are received in the interior drum of the Double RAP and, as a result, they are directly exposed to the hot gas stream produced by first burner assembly 104 in the preferred embodiment of the invention. Consequently, the virgin aggregate is dried and super-heated to temperatures in excess of the final temperature of the finished HMA, i.e. the temperature of the HMA when it is first produced as a combination of coarse RAP, RAP fines, virgin aggregates and/or liquid asphalt cement. The preferred virgin aggregate is conveyed to Double RAP 102 from virgin aggregate bins 110 by virgin aggregate conveyors 112. Preferably, scalping screen 114 is provided along virgin aggregate conveyors 112. The preferred scalping screen 114 is adapted to remove oversized material such as trash and other debris from the virgin aggregate before it is received by Double RAP 102.

In the preferred Double RAP 102, super-heated virgin aggregate is mixed with RAP fines in the mixing chamber of the Double RAP. The mixture of super-heated virgin aggregate and RAP fines has a temperature that is higher than the final temperature of the finished HMA produced by hot mix asphalt plant 100. As discussed below, the temperature of the mixture of super-heated virgin aggregate and RAP fines will be lowered when it is mixed with the coarse RAP which is heated in a separate dryer (e.g., the RAP Dryer) to a temperature lower than the temperature of the finished HMA produced by hot mix asphalt plant 100. No liquid asphalt cement is introduced into the mixture of virgin aggregate and RAP fines in the mixing chamber of Double RAP 102.

The combination of the super-heated virgin aggregate and the RAP fines is preferably conveyed from the mixing chamber of Double RAP 102 to pugmill 116 by Double RAP sloped chute 118. It is contemplated within the scope of the invention, however, that the super-heated virgin aggregate and the RAP fines may be conveyed from the mixing chamber of Double RAP 102 to pugmill 116 by any suitable means. The preferred pugmill 116 is a twin-shaft continuous pugmill located directly under the discharge end of the RAP Dryer, as discussed below, but it is contemplated within the scope of the invention that any suitable device adapted to mix the combination of coarse RAP, virgin aggregate, RAP fines and liquid asphalt cement may be used. Exhaust is conveyed from the preferred Double RAP 102 at the end opposite from first burner assembly 104. Exhaust is preferably conveyed from Double RAP 102 to baghouse 120 through a first exhaust tube such as Double RAP exhaust tube 122 and a second exhaust tube such as RAP Dryer exhaust tube 122A which is described below. The preferred baghouse 120 is adapted to collect dust produced by the production of HMA. In the preferred embodiments, dust silos 121 are also adapted to collect dust. Further, in the preferred embodiments, dust from baghouse 120 is collected by a hopper screw conveyor (not shown) and conveyed by the hopper screw conveyor to dust blower 124. The preferred dust blower blows the dust into the RAP Dyer which is also described below.

Still referring to FIG. 2, the preferred hot mix asphalt plant 100 also includes a parallel flow dryer such as RAP Dryer 130 and second burner assembly 132 which is preferably disposed at one end of the RAP Dryer, i.e., the burner end. The preferred RAP Dryer 130 is a 10'×60', rotating, parallel flow dryer adapted to receive coarse RAP and heat and dry said coarse RAP. The size of the preferred RAP Dryer, however, depends upon the capacity of a particular plant, and non-rotating, non-parallel flow dryers may also be used to heat and dry the coarse RAP. Coarse RAP is preferably defined as RAP having a size of greater than ³⁄₁₆". In the preferred RAP Dryer 130, coarse RAP is received in the burner end of the RAP Dryer and conveyed in the same general direction as the gas flow within the dryer. The preferred second burner assembly 132 may be any suitable burner assembly that is adapted to produce a burner flame and heat and dry materials in the interior of a parallel flow dryer like the preferred RAP Dryer 130.

The larger particles of the coarse RAP heat up more slowly than the RAP fines, have a lower proportion of surface area to volume than the RAP fines, and are heated in the RAP Dryer to a lower temperature than the final temperature of the finished HMA produced by the plant. Indeed, the coarse RAP is preferably heated in RAP Dryer 130 to a temperature in the range of 280° to 290° Fahrenheit. As a result, the coarse RAP heated and dried in RAP Dryer 130 produces less smoke than it would if heated to the temperature of finished HMA. In addition, because the RAP fines and their corresponding high water content are not heated and dried in RAP Dryer 130 and because water evaporation accounts for much of the heat load on a dryer, the heat load on the RAP Dryer is greatly reduced. Consequently, the gas temperatures in RAP Dryer 130 are reduced, the operating life of the dryer is extended, and the amount of smoke produced by the dryer is reduced. Further, the size of RAP Dryer 130 required for a given level of production output is reduced by removing RAP fines from the dryer.

As shown in FIG. 2, in the preferred hot mix asphalt plant 100, coarse RAP is conveyed to RAP Dryer 130 from coarse RAP bins 134 by coarse RAP conveyors 136. The preferred RAP Dryer 130 conveys coarse RAP to pugmill 116 by RAP Dryer vertical chute 138 (see FIG. 3). It is contemplated within the scope of the invention, however, that the coarse RAP may be conveyed to pugmill 116 by any suitable means. It is also contemplated within the scope of the invention that the coarse RAP may be conveyed directly to the mixing chamber of the first dryer and mixed therein with the RAP fines and virgin aggregates. It is further contemplated that liquid asphalt cement could be added to the mixing chamber of the first dryer where it could be mixed with the coarse RAP, RAP fines and virgin aggregates to produce HMA. In the preferred pugmill 116, the coarse RAP and the mixture of super-heated virgin aggregate and RAP fines are mixed and conveyed to HMA drag conveyor 140 by pugmill chute 141 (see FIGS. 3 and 4). When the coarse RAP and the mixture of super-heated virgin aggregate and RAP fines are mixed together, the combination produces HMA at the desired final mix temperature. Liquid asphalt cement and other additives may be added to the combination of coarse RAP, virgin aggregate and RAP fines in pugmill 116.

The preferred drag conveyor 140 conveys the combination of coarse RAP, virgin aggregate and RAP fines to HMA silos 142. While drag conveyor 140 is the preferred means for conveying the finished HMA to HMA silos 142, it is contemplated within the scope of the invention that the finished HMA may be conveyed from the pugmill to HMA silos or any other suitable storage construction or site by any suitable means. Exhaust from the preferred RAP Dryer 130 is conveyed from the end of the dryer opposite from burner assembly 132 to baghouse 120 through a second exhaust tube such as RAP Dryer exhaust tube 122A.

Still referring to FIG. 2, the preferred RAP Dryer 130 is also provided with a gas recirculation system. The preferred gas recirculation system is adapted to recirculate a portion of the exhaust from the second dryer and produce a recirculated gas stream. More particularly, the gas recirculation system is adapted to remove a portion of the exhaust gases from the end of RAP Dryer 130 opposite from second burner assembly 132 and convey it to the end of the RAP Dryer at which the second burner assembly is disposed via a plurality of gas recirculation tubes 144, 145 and 146. The preferred gas recirculation system includes first gas recirculation tube 144 which extends from the end of RAP Dryer 130 opposite from the second burner assembly to separator cyclone 148. The preferred separator cyclone 148 is adapted to remove dust and RAP particles from the recirculated gas stream and drop them into pugmill 116 such that they are incorporated into the finished HMA. As dry dust is conveyed by the recirculated gases, dust contacts hot RAP particles and adheres to them. The dust-coated RAP particles reduce the incidence of RAP particles adhering to the plant equipment surfaces. The recirculated gas is preferably conveyed from separator cyclone 148 to gas recirculation fan 150 by gas recirculation tube 145. The preferred gas recirculation fan 150 is adapted to urge the recirculated gas stream toward the airheater. More particularly, the preferred gas recirculation fan 150 is adapted to produce a flow of gases from the end of RAP Dryer 130 opposite from the second burner assembly 132 toward separator cyclone 148. In addition, the preferred gas recirculation system includes preseparator 151 that is adapted to remove dust from the main gas stream.

The recirculated gas is preferably conveyed from separator cyclone 148 to airheater 152 by gas recirculation tube 146. The preferred airheater 152 is disposed at the same end of RAP Dryer 130 as the second burner assembly and adapted to receive recirculated gases from gas recirculation tube 146. The preferred airheater 152 includes a combustion chamber into which the burner assembly fires. The recirculated gases from RAP Dryer 130 are preferably conveyed into airheater 152 in a manner that tends to maintain separation from the hot combustion products from the second burner assembly. Preferably, the recirculated gases are swirled in airheater 152 by tangentially introducing them into the airheater. The swirling flow of the recirculated gases encourages a blanketing effect of the recirculated gases around the burner flame temperature gases discussed below and further protects the coarse RAP in RAP Dryer 130 from excessive temperatures. Mixing of recirculated gases and hot combustion products is delayed so as to allow both gas streams to reduce their temperatures before they are completely mixed. While the preferred gas recirculation system is described and illustrated as having three gas recirculation tubes, it is contemplated within the scope of the invention that the gas recirculation system may have more or less than three gas recirculation tubes.

Figure 2A:
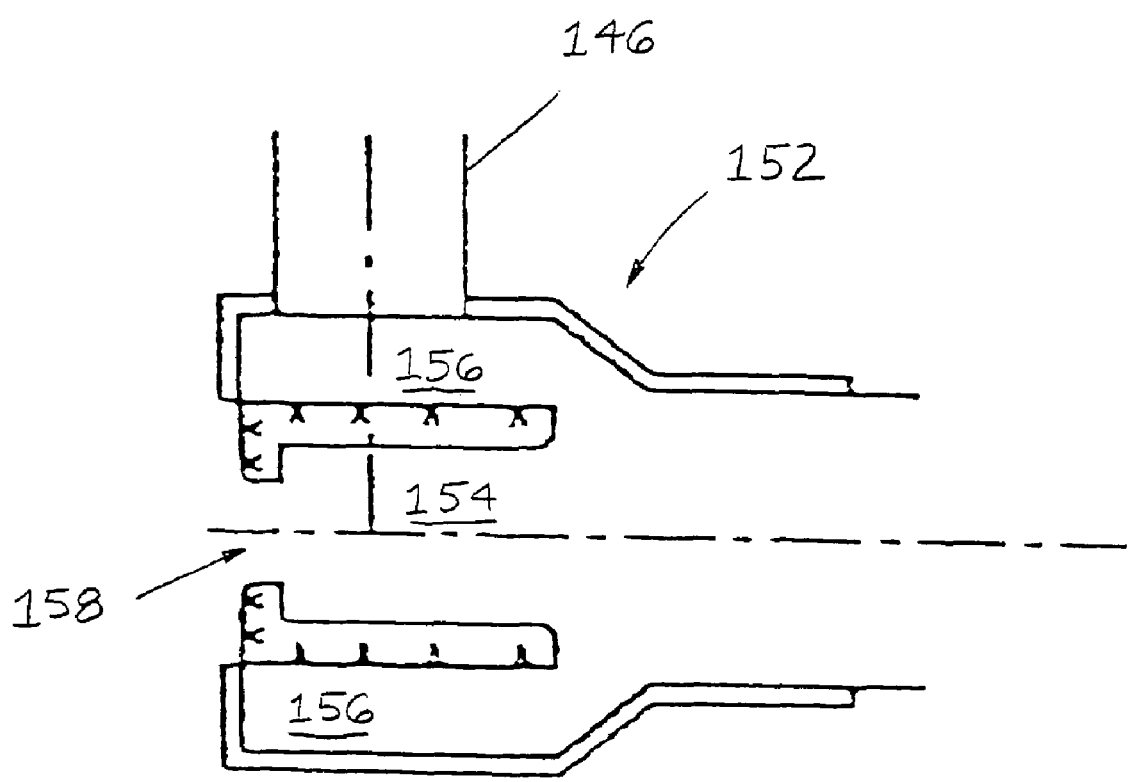
FIG. 2A is a partial sectional front view of the preferred airheater used in connection with the hot mix asphalt plant illustrated in FIG. 2.

Referring now to FIG. 2A, a partial sectional front view of preferred airheater 152 is illustrated. As shown in FIG. 2A, the preferred airheater 152 is adapted to receive recirculated gases from third gas recirculation tube 146 and includes combustion chamber 154. The preferred combustion chamber 154 is disposed in the center of the airheater and the second burner assembly 132 is adapted to fire a burner flame into the combustion chamber. The preferred airheater 152 also includes an annular space 156 surrounding the combustion chamber. The preferred annular space 156 is adapted to receive recirculated gases from the gas recirculation system. The preferred combustion chamber 154 also includes an open end 158 where burner flame temperature gases begin to mix with recirculated gases from the gas recirculation system. Preferably, the burner flame temperature gases do not completely mix with recirculated gases from the gas recirculation system such that a thick boundary layer of the cooler recirculated gases surrounds the burner flame temperature gases exiting the combustion chamber and the boundary layer of cooler recirculated gases, not the burner flame temperature gases, contacts the incoming cool and wet coarse RAP. The cooler recirculated gases prevent the coarse RAP from being heated to high temperatures which would result in excessive smoke production and damage to the coarse RAP.

In order to further accomplish the reduction of smoke produced by the coarse RAP in the RAP Dryer, in the preferred embodiments of the plant, coarse RAP is not exposed to the burner flame temperature gases immediately upon being received in the RAP Dryer. Preferably, the coarse RAP introduced into RAP Dryer 130 is not exposed to the burner flame temperature gases until it is approximately 15' to 20' downstream from the burner end of the dryer. The preferred RAP Dryer 130, therefore, does not shower coarse RAP in the dryer drum in the space approximately 15' to 20' downstream from the burner end of the RAP dryer. The preferred RAP Dryer 130 accomplishes this by having T-flights that roll and spread the coarse RAP but do not lift the coarse RAP and shower it into the burner flame temperature gases in the space approximately 15' to 20' downstream from the burner end. Heat transfer in this section of preferred RAP Dryer 130 occurs primarily as a result of a radiation from the burner flame temperature gases to the coarse RAP and the dryer drum. In addition, some heat is transferred by conduction and convection between the boundary layer of recirculated gases, the coarse RAP and the dryer drum in the non-showering section of the preferred RAP Dryer. Further, the mixture of the recirculated gases with the burner flame temperature gases tends to reduce the burner flame temperature gases and the overall temperature in the RAP dryer. Overall, the preferred airheater 152 minimizes the heat impact on the coarse RAP introduced into the RAP Dryer.

In calculations performed to date, the recirculated gases contribute to a temperature reduction from approximately 2600° Fahrenheit to approximately 700° to 900° Fahrenheit in the RAP Dryer. The reduced temperature extends the operating life of the RAP Dryer and results in less smoke produced by the RAP Dryer. In addition, calculations indicate that the gas recirculating system of the preferred hot mix asphalt plant 100 causes more gas to be recirculated than exhausted. For example, it has been calculated that for a plant designed to produce 220 tons of HMA per hour, the RAP Dryer exhaust volume is 19,010 cfm, while the volume of RAP Dryer recirculated gas is 62,678 cfm.

Figure 3:
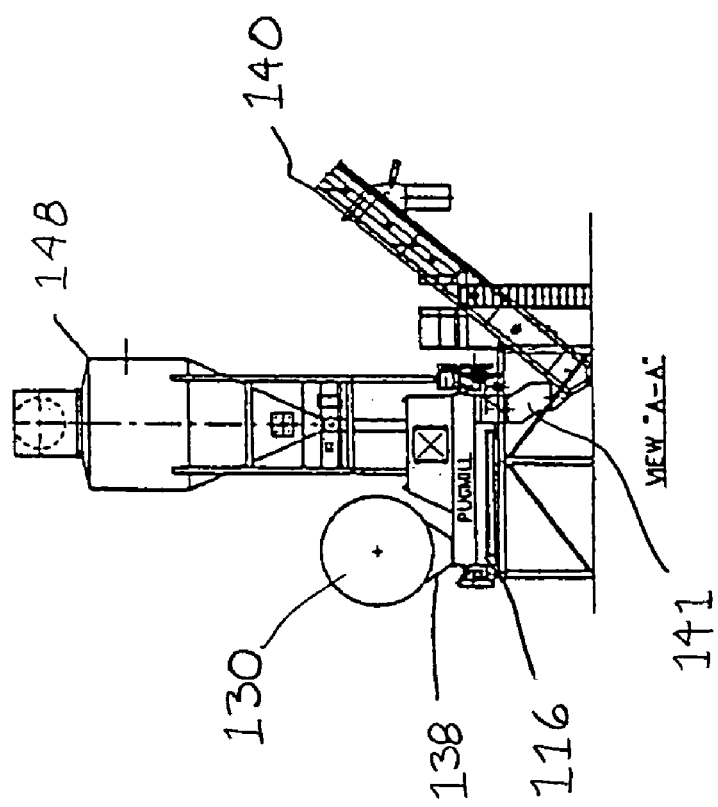
FIG. 3 is a partial sectional view taken along line A-A of FIG. 2.

Referring now to FIG. 3, a partial sectional view taken along line A-A of FIG. 2 is illustrated. As shown in FIG. 3, the preferred hot mix asphalt plant 100 includes RAP Dryer 130 which is disposed above pugmill 116. Coarse RAP is preferably conveyed from RAP Dryer 130 to pugmill 116 by vertical chute 138. The preferred pugmill 116 is disposed above the lower end of HMA drag conveyor 140. The combination of coarse RAP from RAP Dryer 130, the mixture of virgin aggregate and RAP fines from the Double RAP (not shown), and liquid AC is preferably conveyed from pugmill 116 to drag conveyor 140 by pugmill chute 141. Also in the preferred hot mix asphalt plant 100, cyclone separator 148 is disposed above pugmill 116.

Figure 4:
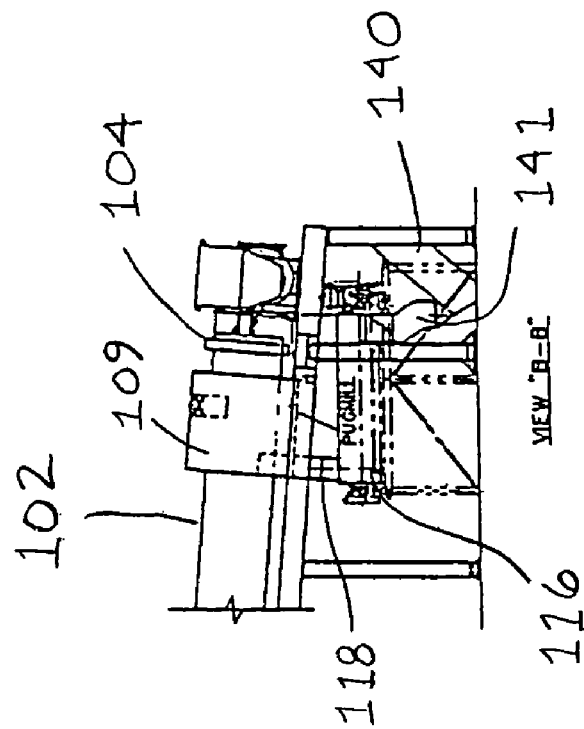
FIG. 4 is a partial sectional view taken along line B-B of FIG. 2.

Referring now to FIG. 4, a partial sectional view taken along line B-B of FIG. 2 is illustrated. As shown in FIG. 4, the preferred hot mix asphalt plant 100 includes Double RAP 102 having mixing chamber 109 and first burner assembly 104 which are disposed above pugmill 116. The mixture of virgin aggregates and RAP fines is preferably conveyed from Double RAP 102 by Double RAP sloped chute 118.

Figure 5:
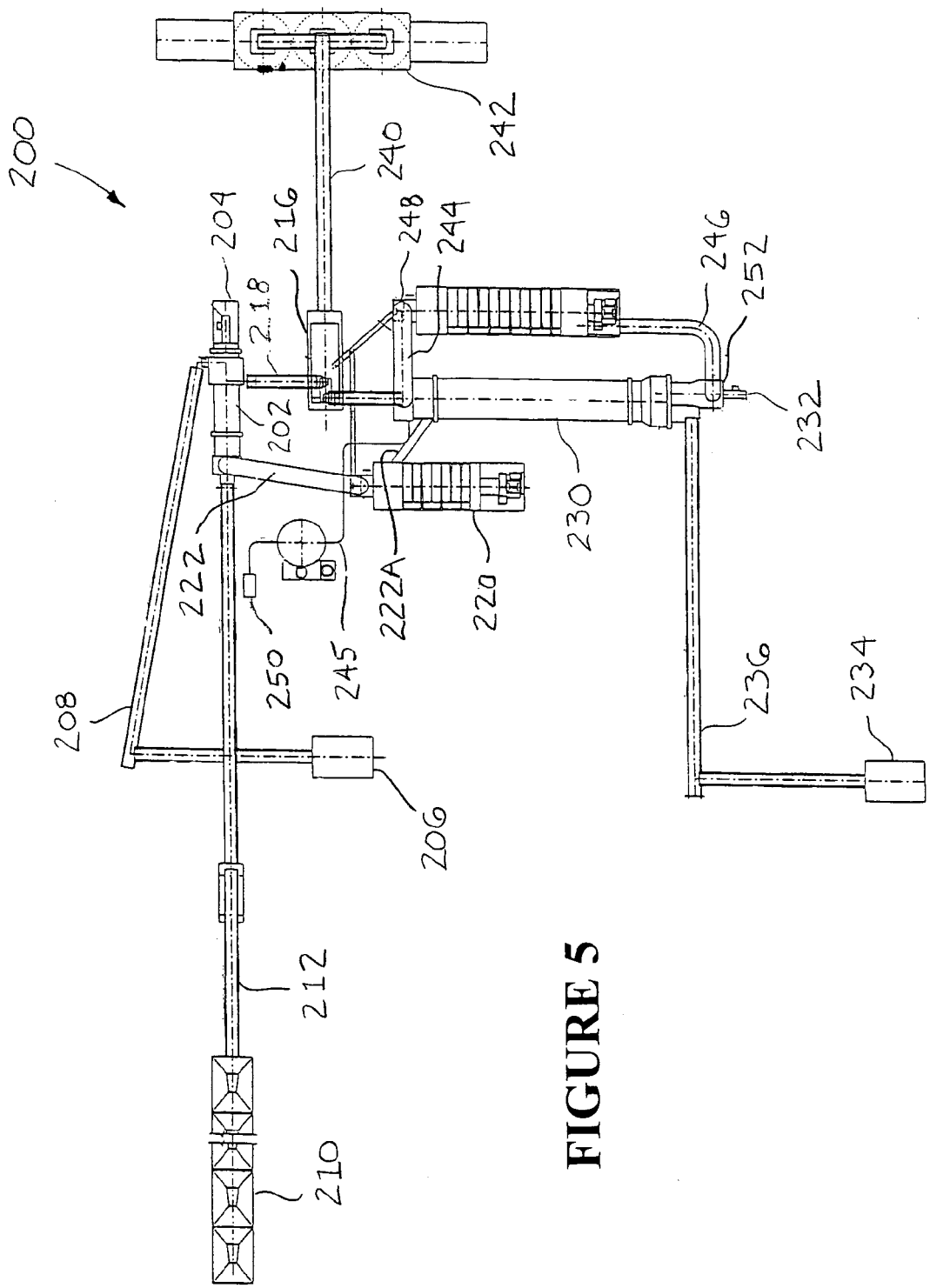
FIG. 5 is a partial sectional top view of an alternative embodiment of the hot mix asphalt plant in accordance with the present invention.

Referring now to FIG. 5, a partial sectional top view of an alternative embodiment of the hot mix asphalt plant in accordance with the present invention is illustrated. As shown in FIG. 5, alternative hot mix asphalt plant 200 includes substantially the same components as preferred hot mix asphalt plant 100 in substantially the same arrangement. Unlike preferred hot mix asphalt plant 100, alternative hot mix asphalt plant 200 does not include a dust silo or a dust blower. However, alternative hot mix asphalt plant 200 includes Double RAP 202 and first burner assembly 204. The preferred Double RAP 202 is adapted to receive RAP fines from RAP fines bin 206 via RAP fines conveyors 208 at its burner end in the mixing chamber and virgin aggregate from virgin aggregate bins 210 via virgin aggregate conveyors 212 at its opposite end in its interior drum. The mixture of virgin aggregate and RAP fines is conveyed from Double RAP 202 to pugmill 216 by Double RAP sloped chute 218. Exhaust is conveyed from Double RAP 202 to baghouse 220 by Double RAP exhaust tube 222.

Still referring to FIG. 5, alternative hot mix asphalt plant 200 also includes RAP Dryer 230 and second burner assembly 232. RAP Dryer 230 is adapted to receive coarse RAP from coarse RAP bins 234 via coarse RAP conveyors 236 at its burner end and heat and dry the coarse RAP. The heated and dried coarse RAP is conveyed from RAP Dryer 230 to pugmill 216 by a RAP Dryer a vertical chute (see FIG. 6). Pugmill 216 mixes the combination of coarse RAP from RAP Dryer 230 and the mixture of virgin aggregate and RAP fines from Double RAP 202 to produce HMA. The HMA is then conveyed from pugmill 216 to HMA drag conveyor 240 by a pugmill chute (not shown). Drag conveyor 240 conveys the HMA to HMA silos 242. Exhaust from RAP Dryer 230 is conveyed from the RAP Dryer to baghouse 220 by RAP Dryer exhaust tube 222A. The alternative hot mix asphalt plant 200 further includes a gas recirculating system having gas recirculating tubes 244, 245 and 246, separator cyclone 248, gas recirculation fan 250 and airheater 252.

The layout of alternative hot mix asphalt plant 200 is also different from the layout of preferred hot mix asphalt plant 100. For example, the feed path for the virgin aggregate and the RAP fines in alternative hot mix asphalt plant 200 is different from the feed path for the virgin aggregate and the RAP fines in preferred hot mix asphalt plant 100. In addition, the location of the baghouse in alternative hot mix asphalt plant 200 is different from the location of the baghouse in preferred hot mix asphalt plant 100. As a result, the exhaust tube from the Double RAP and the RAP Dryer in alternative hot mix asphalt plant 200 is different from the exhaust tube from the Double RAP and the RAP Dryer in preferred hot mix asphalt plant 100.

Figure 6:
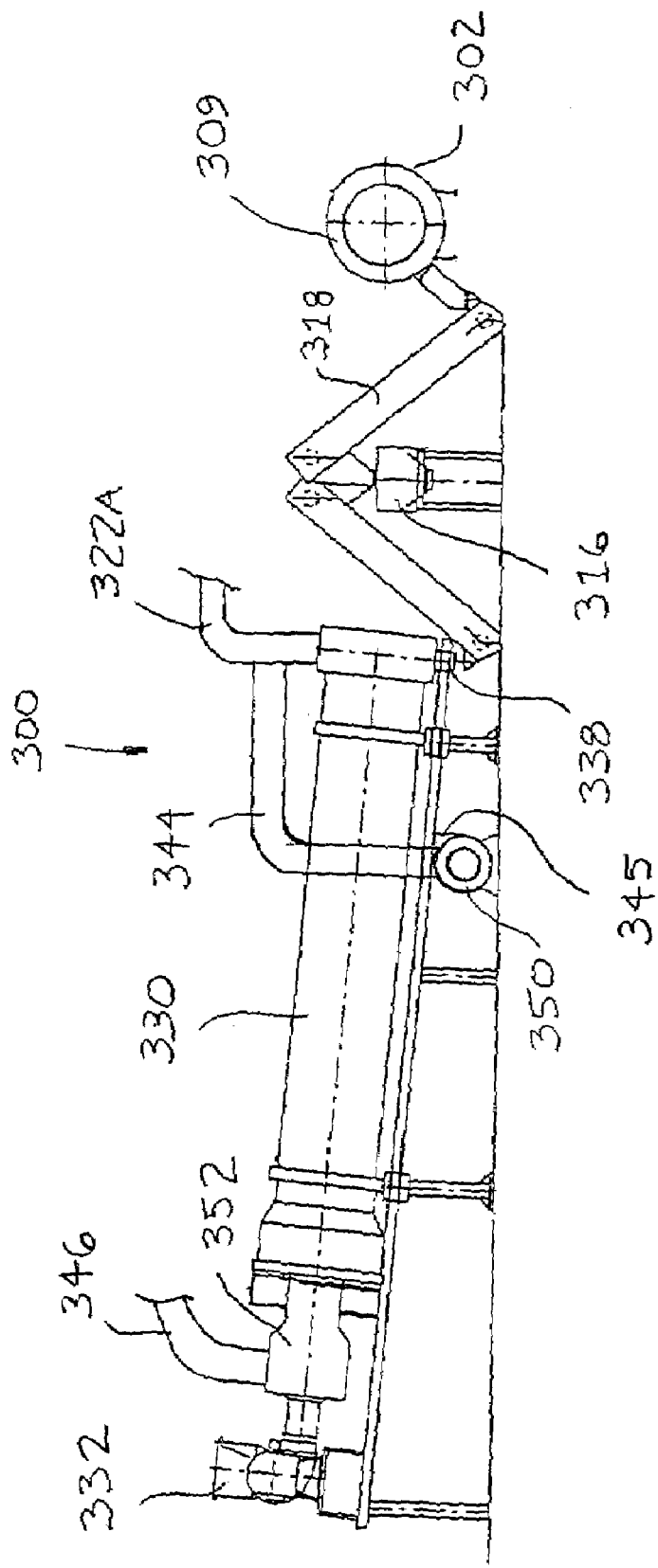
FIG. 6 is a partial sectional front view of an alternative embodiment of the hot mix asphalt plant in accordance with the present invention.

Referring now to FIG. 6, a partial sectional front view of an alternative embodiment of the hot mix asphalt plant in accordance with the present invention is illustrated. As shown in FIG. 6, alternative hot mix asphalt plant 300 is similar to alternative hot mix asphalt plant 200 shown in FIG. 5. More particularly, alternative hot mix asphalt plant 300 includes Double RAP 302 which is adapted to receive RAP fines at its burner end in mixing chamber 309 and virgin aggregate at its opposite end in its interior drum. The mixture of virgin aggregate and RAP fines is conveyed from Double RAP 302 to pugmill 316 by Double RAP sloped chute 318. Alternative hot mix asphalt plant 300 also includes RAP Dryer 330 and second burner assembly 332. RAP Dryer 330 is adapted to receive coarse RAP at its burner end and heat and dry the coarse RAP. The heated and dried coarse RAP is conveyed from RAP Dryer 330 to pugmill 316 by RAP Dryer vertical chute 338. Pugmill 316 mixes the combination of coarse RAP from RAP Dryer 330 and the mixture of virgin aggregate and RAP fines from Double RAP 302 to produce HMA. Exhaust from RAP Dryer 330 is conveyed from the RAP Dryer to a baghouse (not shown) by RAP Dryer exhaust tube 322A (partially shown). The alternative hot mix asphalt plant 300 further includes a gas recirculating system having gas recirculating tubes 344, 345 (partially shown) and 346 (partially shown), a separator cyclone (not shown), gas recirculation fan 350 and airheater 352.

The invention also comprises a method for producing HMA using a high percentage of RAP. The preferred method of the invention comprises providing a hot mix asphalt plant adapted to produce hot mix asphalt using a high percentage of RAP. The preferred plant includes a first dryer adapted to receive and mix virgin aggregates and RAP fines, a first burner assembly adapted to produce a burner flame and heat and dry the virgin aggregates in the first dryer, a second dryer adapted to receive coarse RAP, and a second burner assembly adapted to produce a burner flame and heat and dry the coarse RAP in the second dryer. The preferred method further includes conveying the virgin aggregates to the first dryer, heating and drying the virgin aggregates in the first dryer, conveying the RAP fines to the first dryer, mixing the virgin aggregates and the RAP fines in the first dryer, conveying the coarse RAP to the second dryer, heating and drying the coarse RAP in the second dryer, and mixing the coarse RAP, the RAP fines and the virgin aggregates to produce hot mix asphalt.

In the preferred embodiments of the invention, the method comprises the step of providing a hot mix asphalt plant having a counterflow dryer and a first burner assembly which is preferably disposed at one end of the counterflow dryer. The preferred counterflow dryer is adapted to receive RAP fines and heat and dry the RAP fines in the mixing chamber of the counterflow dryer at the same end of the dryer that the burner assembly is disposed. The preferred counterflow dryer is also adapted to receive virgin aggregate at the end of the dryer that is opposite from the burner assembly and heat and dry the virgin aggregate in the interior drum of the dryer. The preferred burner assembly is adapted to produce a burner flame and heat and dry materials in the interior of the counterflow dryer. The preferred hot mix asphalt plant also includes a parallel flow dryer and a second burner assembly. The preferred parallel flow dryer is adapted to receive coarse RAP and heat and dry coarse RAP. The preferred second burner assembly is adapted to produce a burner flame and heat and dry materials in the interior of the parallel flow dryer.

The preferred hot mix asphalt plant also includes a gas recirculation system. The preferred gas recirculation system is adapted to remove a portion of the exhaust gases from the end of the second dryer opposite from the second burner assembly and convey such gases to the end of the second dryer at which the second burner assembly is disposed via a plurality of gas recirculation tubes. The preferred gas recirculation system also includes a separator cyclone that is adapted to remove dust from the flow of recirculated gas and convey such dust to the pugmill. A gas recirculation fan which is adapted to produce a flow of gas from the end of the second dryer opposite from the second burner assembly toward an airheater which is adapted to receive recirculated gases from a gas recirculation tube. In addition, the preferred gas recirculation system includes a preseparator that is adapted to remove dust from the main gas stream, i.e., the exhaust gas stream.

The preferred method of the invention also comprises the steps of conveying to the counterflow dryer RAP fines from a RAP fines bin by a RAP fines conveyor, and conveying to the counterflow dryer virgin aggregate from a virgin aggregate bin by a virgin aggregate conveyor. In the preferred method, a scalping screen adapted to remove oversized material such as trash and other debris is provided along the virgin aggregate conveyor upstream from the counterflow dryer. The preferred method further includes the steps of mixing the virgin aggregate with the RAP fines in the mixing chamber of the counterflow dryer and conveying the combination from the mixing chamber of counterflow dryer to a pugmill. Exhaust is preferably conveyed from the counterflow dryer to the baghouse through an exhaust tube.

The preferred method further comprises the step of conveying coarse RAP to the second dryer from a coarse RAP bin by a coarse RAP conveyor. The preferred parallel dryer conveys the coarse RAP to the pugmill by a RAP Dryer vertical chute. The preferred pugmill mixes the combination of coarse RAP, virgin aggregate and RAP fines to produce HMA. The preferred method also includes the step of adding liquid asphalt cement to the combination of coarse RAP, virgin aggregate and RAP fines in the pugmill. The preferred pugmill also conveys the HMA to an HMA drag conveyor by a pugmill chute. The preferred drag conveyor then conveys the HMA to an HMA silo. Exhaust from the preferred parallel flow dryer is conveyed from the end of the dryer opposite from the second burner assembly to the baghouse through an exhaust tube.

The preferred method still further comprises the step of recirculating exhaust gases from the second dryer from one end of said dryer to the other end of said dryer. The gas recirculation system includes a plurality of gas recirculation tubes, a gas recirculation fan, a separator cyclone, and an airheater. According to the preferred method, exhaust gases from the parallel flow dryer are first conveyed to the separator cyclone, then to the gas recirculation fan, and then to the airheater. The preferred method also includes the step of conveying dust and coated RAP particles from the separator cyclone to the pugmill so as to be mixed with the HMA. Further, the preferred method includes the step of conveying dust collected in the baghouse to the parallel flow dryer via a dust blower.

In operation, several advantages of the preferred embodiments of the invention are achieved. For example, the preferred embodiments of the apparatus and method for a hot mix asphalt plant described herein provides a hot mix asphalt plant using a high percentage of RAP. Because RAP is initially separated by gradation size and then introduced into a different dryers depending upon gradation size in the preferred embodiments, the production of smoke and other harmful emissions caused by the heating and drying of RAP fines is reduced. For the same reason, the preferred embodiments produce high quality, cost-effective hot mix asphalt and the heating and drying loads placed on the parallel flow dryer are reduced. The separation of RAP fines and coarse RAP also provides greater control over the characteristics of the finished hot mix asphalt produced by the plant by controlling the size and proportions of RAP gradations used in the process. The preferred embodiments also recirculate a large proportion of the gases produced by the parallel flow dryer, reduce the amount of airborne RAP particles, and reduce sticking between RAP particles and the equipment of the plant.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A method for producing hot mix asphalt using a high percentage of RAP, said method comprising:
    (a) providing a hot mix asphalt plant adapted to produce hot mix asphalt using a high percentage of RAP, said plant comprising:
        (1) a first dryer adapted to receive and mix virgin aggregates and RAP fines, said first dryer having an inner drum, a fixed outer sleeve and a mixing chamber defined therebetween;
        (2) a first burner assembly adapted to produce a first burner flame and a hot gas stream, said first burner flame and hot gas stream being adapted to heat and dry the virgin aggregates in the first dryer;
        (3) a second dryer adapted to receive coarse RAP;
        (4) a second burner assembly adapted to produce a second burner flame and heat and dry the coarse RAP in the second dryer;
        wherein the virgin aggregates are received in the inner drum, the RAP fines are received in the fixed outer sleeve such that they are not directly exposed to the hot gas stream produced by the first burner assembly, and the virgin aggregates and RAP fines are mixed in the mixing chamber;
    (b) conveying the virgin aggregates to the first dryer;
    (c) heating and drying the virgin aggregates in the first dryer;
    (d) conveying the RAP fines to the first dryer;
    (e) mixing the virgin aggregates and the RAP fines in the first dryer;
    (f) conveying the coarse RAP to the second dryer;
    (g) heating and drying the coarse RAP in the second dryer;
    (h) mixing the coarse RAP, the RAP fines and the virgin aggregates to produce hot mix asphalt.

2. The method of claim 1 further comprising:
    (i) adding liquid asphalt cement to the mixture of coarse RAP, RAP fines and virgin aggregates.

3. The method of claim 1 wherein the hot mix asphalt plant adapted to produce hot mix asphalt using a high percentage of RAP further comprises a pugmill adapted to receive the virgin aggregates and the RAP fines from the first dryer and the coarse RAP from the second dryer and mix the virgin aggregates, the RAP fines and the coarse RAP to produce hot mix asphalt, and the method further comprises:
    (i) conveying the virgin aggregates and the RAP fines from the first dryer to the pugmill;
    (j) conveying the coarse RAP from the second dryer to the pugmill; and
    (k) mixing the coarse RAP, the RAP fines and the virgin aggregates in the pugmill to produce hot mix asphalt.

4. The method of claim 1 wherein the hot mix asphalt produced by the process has a final temperature, and wherein the virgin aggregates are heated to a temperature higher than the final temperature of the finished hot mix asphalt and the coarse RAP is heated to a temperature lower than the final temperature of the finished hot mix asphalt.

5. The method of claim 1 wherein the RAP fines and the virgin aggregates are mixed in the mixing chamber which is separated from the burner flame produced by the first burner assembly.

6. The method of claim 1 wherein the combination of the coarse RAP and the RAP fines constitute up to approximately eighty percent (80%) of the material used to produce the hot mix asphalt.

7. The method of claim 1 wherein the hot mix asphalt plant for producing hot mix asphalt using a high percentage of RAP further comprises a gas recirculation system adapted to recirculate a portion of the exhaust from the second dryer and produce a recirculated gas stream, said gas recirculation system comprising an airheater disposed adjacent to the second burner assembly and adapted to receive the recirculated gas stream, a gas recirculation tube adapted to convey the recirculated gas stream from the second dryer to the airheater, a gas recirculation fan adapted to urge said recirculated gas stream toward the airheater, and a separator cyclone adapted to remove dust and RAP particles from the recirculated gas stream and convey said dust and RAP particles to the hot mix asphalt; and wherein the method further comprises:
    (i) conveying the recirculated gas stream from the second dryer to the airheater;
    (j) removing dust and RAP particles from the recirculated gas stream; and
    (k) conveying said dust and RAP particles from the recirculated gas stream to the hot mix asphalt.

8. The method of claim 7 further comprising:
    (l) blowing dust collected in a baghouse into the airheater.

* * * * *